(12) United States Patent
van der Linden

(10) Patent No.: US 6,311,188 B1
(45) Date of Patent: Oct. 30, 2001

(54) METHOD AND APPARATUS FOR ELEMENT SELECTION EXHAUSTING AN ENTIRE ARRAY

(75) Inventor: Peter van der Linden, Los Altos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/167,518

(22) Filed: Oct. 6, 1998

(51) Int. Cl.$^7$ .................................................. G06F 17/00
(52) U.S. Cl. .................... 707/102; 707/101; 707/200; 707/7
(58) Field of Search ................ 707/3–10, 101–103, 707/201–206; 712/200–209

(56) References Cited

U.S. PATENT DOCUMENTS

| | | | |
|---|---|---|---|
| 5,621,908 | * 4/1997 | Akaboshi et al. | 707/7 |
| 5,704,057 | * 12/1997 | Cho | 707/7 |
| 5,806,064 | * 9/1998 | Garza | 707/3 |
| 5,857,207 | * 1/1999 | Lo et al. | 707/203 |

OTHER PUBLICATIONS

Lippman, "C + + Primer", Jul. 1989, pp. 47–49.*
Edward M. Reingold et al., "Transposition Sorting", 1977, Combinatorial Algoritms, Theory & Practice, p. 283–285.

Jerry M. Rosenberg, Jun. 1987, Dictionary of Computer Information Processing & Telecommunications, $2^{nd}$ Edition, p. 66.

Alfred V. Aho et al., "3.2 Radix Sorting",Jun. 1974, The Design and Analysis of Computer Algorithms, pp. 77 & 102.

* cited by examiner

*Primary Examiner*—Thomas Black
*Assistant Examiner*—David Jung
(74) *Attorney, Agent, or Firm*—Beyer Weaver & Thomas

(57) ABSTRACT

Methods and apparatus for element selection exhausting an entire array are disclosed. A method for processing an array having a plurality of elements includes selecting one of the plurality of elements. An index is maintained dividing the array into a first section containing each selected one of the plurality of elements and a second section containing each unselected one of the plurality of elements. The selected one of the plurality of elements is then swapped with an unprocessed element in the array such that the selected one of the plurality of elements is stored in the first section of the array. The selected one of the plurality of elements may then be processed.

13 Claims, 3 Drawing Sheets

Array [0] = A
Array [1] = B
Array [2] = C
Array [3] = D
Array [4] = E
Array [5] = F
Array [6] = G Initial lower bound index = 0
Upper bound index = 6

*FIG. 3A*

Array [0] = F
Array [1] = B
Array [2] = C
Array [3] = D
Array [4] = E
Array [5] = A
Array [6] = G Current lower bound index = 0
Upper bound index = 6

*FIG. 3B*

Array [0] = F
Array [1] = D
Array [2] = C
Array [3] = B
Array [4] = E
Array [5] = A
Array [6] = G Current lower bound index = 0
Upper bound index = 6

*FIG. 3C*

METHOD AND APPARATUS FOR ELEMENT SELECTION EXHAUSTING AN ENTIRE ARRAY

BACKGROUND OF THE INVENTION

1. Field of Invention

The present invention relates generally to computer systems. More particularly, the present invention relates to array element selection with reduced memory consumption.

2. Description of the Related Art

In software applications, data is typically manipulated through the use of various data structures. The data structures selected for a particular software application must provide adequate memory as well as permit efficient retrieval of the data during execution of the application. By way of example, arrays are often used when a predetermined number of data elements are to be processed.

Often, array elements are stored in a predetermined order and are therefore processed consecutively. However, under a variety of circumstances, processing of each array element in an alternate order is preferable. By way of example, each array element may correspond to a particular software process. It may therefore be desirable to change the priority of one or more processes through selecting each process, or array element, in the desired priority order. As yet another example, it may be desirable to process the array in a random order.

When elements in an array are not processed in a consecutive order, it is necessary to maintain a record of the elements that have been selected. Conventional methods typically require the allocation of a second array data structure. By way of example, a corresponding element in a second array of boolean values may be flagged when the array element is selected. As yet another example, a second array or equivalent memory space may be allocated to store each selected element in the array.

Allocating duplicate memory space to process a single array results in inefficient use of available memory. This is particularly problematic in systems with limited data storage space. By way of example, memory space is limited in applications implemented in firmware or embedded systems. Accordingly, it would be desirable if each element in an array could be processed in a non-consecutive order without using a second array or equivalent memory space.

Prior to processing an array, the elements in the array are commonly sorted. One standard sort algorithm that may be used to sort array elements is the "bubble sort" algorithm. According to the "bubble sort" algorithm, adjacent array elements are compared and swapped if they are not in the correct order. In this manner, each pair of adjacent elements is compared and swapped until the smallest (or largest) element "bubbles" to the top of the array. This process is repeated until the entire array is sorted. Thus, since numerous passes are required and multiple pairs of elements must be compared in order to sort the array, this algorithm is inefficient and therefore impractical to implement in most applications. Moreover, this algorithm does not permit an array to be processed and sorted according to any selection criteria. Accordingly, it would be desirable if an array could be sorted and processed according to any order such that each element may be selected and processed without duplication.

SUMMARY OF THE INVENTION

The present invention provides methods and apparatus for reordering and processing elements in an array in a non-consecutive order. This is accomplished through swapping each selected array element with an unselected array element. Accordingly, each array element may be reordered upon selection and processed.

According to one aspect of the present invention, a method for processing elements in an array is disclosed. One of the plurality of elements is selected. The element may be selected according to any order, such as a specified priority order or a random order. The selected element is then swapped with an unselected element in the array. This may be accomplished through separating each selected element from each element that remains to be selected. The selected element may then be processed. Alternatively, the method may be used to reorder the entire array which may then be processed according to the order of selection.

The present invention permits reordering and processing of array elements according to a specified order. This may be accomplished through swapping each selected element with an element that remains to be selected. Accordingly, memory utilized during reordering and processing of the array is minimized.

BRIEF DESCRIPTION OF THE DRAWINGS

FIG. 3A illustrates an exemplary array on which the method of FIG. 2 may be applied.

FIG. 3B illustrates the exemplary array of FIG. 3A after a first application of the method of FIG. 2.

FIG. 3C illustrates the exemplary array of FIG. 3A after a subsequent application of the method of FIG. 2.

DETAILED DESCRIPTION OF THE EMBODIMENTS

The present invention provides methods and apparatus for reordering elements in an array. The array elements may be processed immediately upon selection or upon completion of the reordering process. Reordering of the array elements is accomplished through swapping each selected array element with an unselected array element. In this manner, an array may be reordered and processed without the use of a second array or equivalent memory space.

In one embodiment of the invention, a first array element in the array is selected. The selected first array element is swapped with an array element located in a first storage location. The selected first array element is then processed. An array element that has not been previously selected is then selected, swapped with an array element located in a next storage location that is located adjacent the storage location of the previously selected array element, and processed. Accordingly, the selecting, swapping, and processing steps may be iteratively performed for each array element until the entire array is exhausted.

Figure 1:
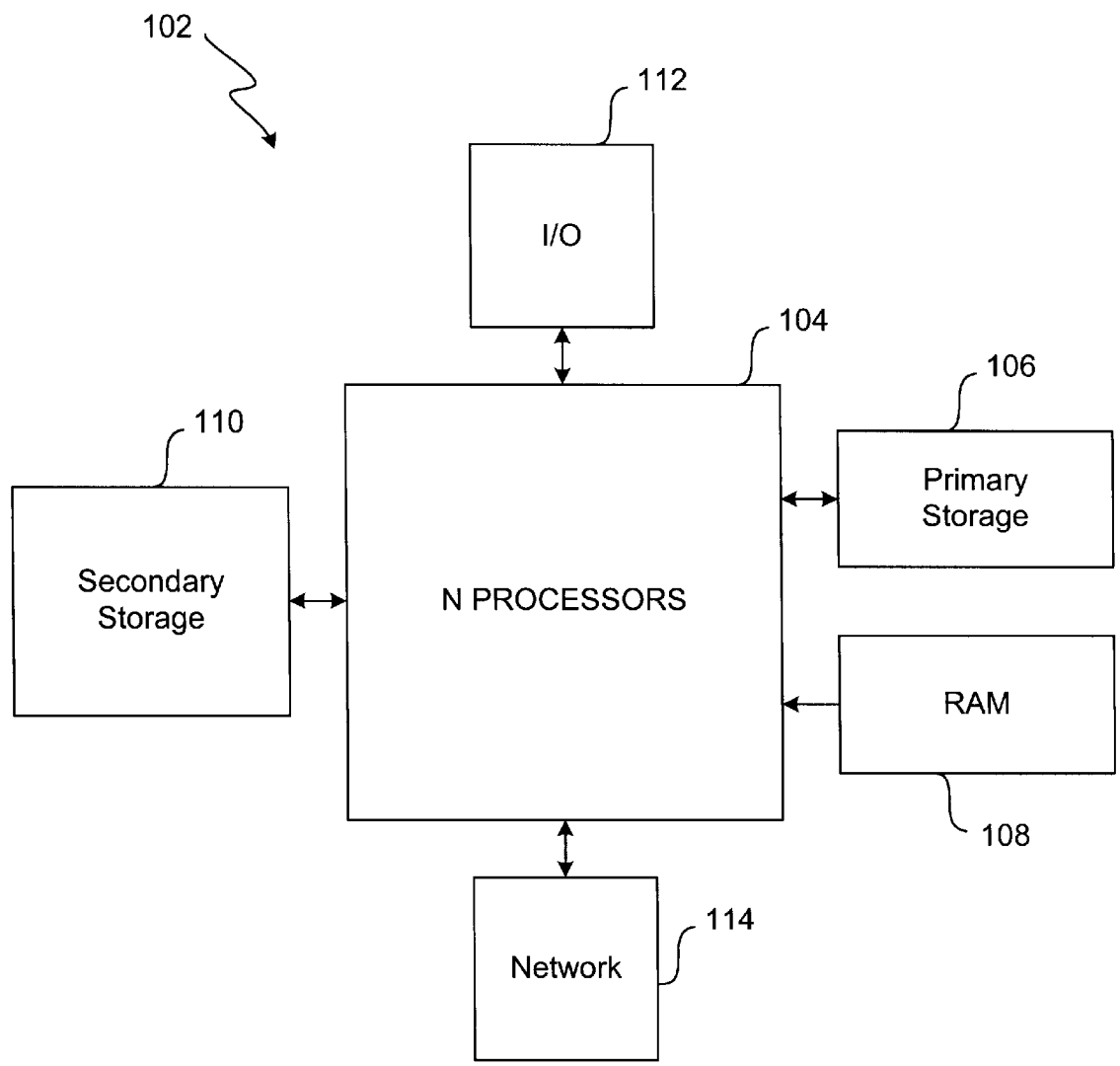
FIG. 1 illustrates a typical, general-purpose computer system suitable for implementing the present invention.

The present invention may generally be implemented on any suitable computer system. FIG. 1 illustrates a typical, general-purpose computer system 102 suitable for implementing the present invention. The computer system 102 includes any number of processors 104 (also referred to as central processing units, or CPUs) that may be coupled to memory devices including primary storage device 106 (typically a read only memory, or ROM) and primary storage device 108 (typically a random access memory, or RAM). As is well known in the art, ROM acts to transfer data and instructions uni-directionally to the CPUs 104, while RAM is used typically to transfer data and instructions in a bi-directional manner. Both the primary storage devices 106, 108 may include any suitable computer-readable media. The CPUs 104 may generally include any number of processors.

A secondary storage medium 110, which is typically a mass memory device, may also be coupled bi-directionally to CPUs 104 and provides additional data storage capacity. The mass memory device 110 is a computer-readable medium that may be used to store programs including computer code, data, and the like. Typically, the mass memory device 110 is a storage medium such as a hard disk which is generally slower than primary storage devices 106, 108.

The CPUs 104 may also be coupled to one or more input/output devices 112 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 104 optionally may be coupled to a computer or telecommunications network, e.g., an internet network or an intranet network, using a network connection as shown generally at 114. With such a network connection, it is contemplated that the CPUs 104 might receive information from the network, or might output information to the network in the course of performing the below-described method steps. Such information, which is often represented as a sequence of instructions to be executed using the CPUs 104, may be received from and outputted to the network, for example, in the form of a computer data signal embodied in a carrier wave.

Figure 2:
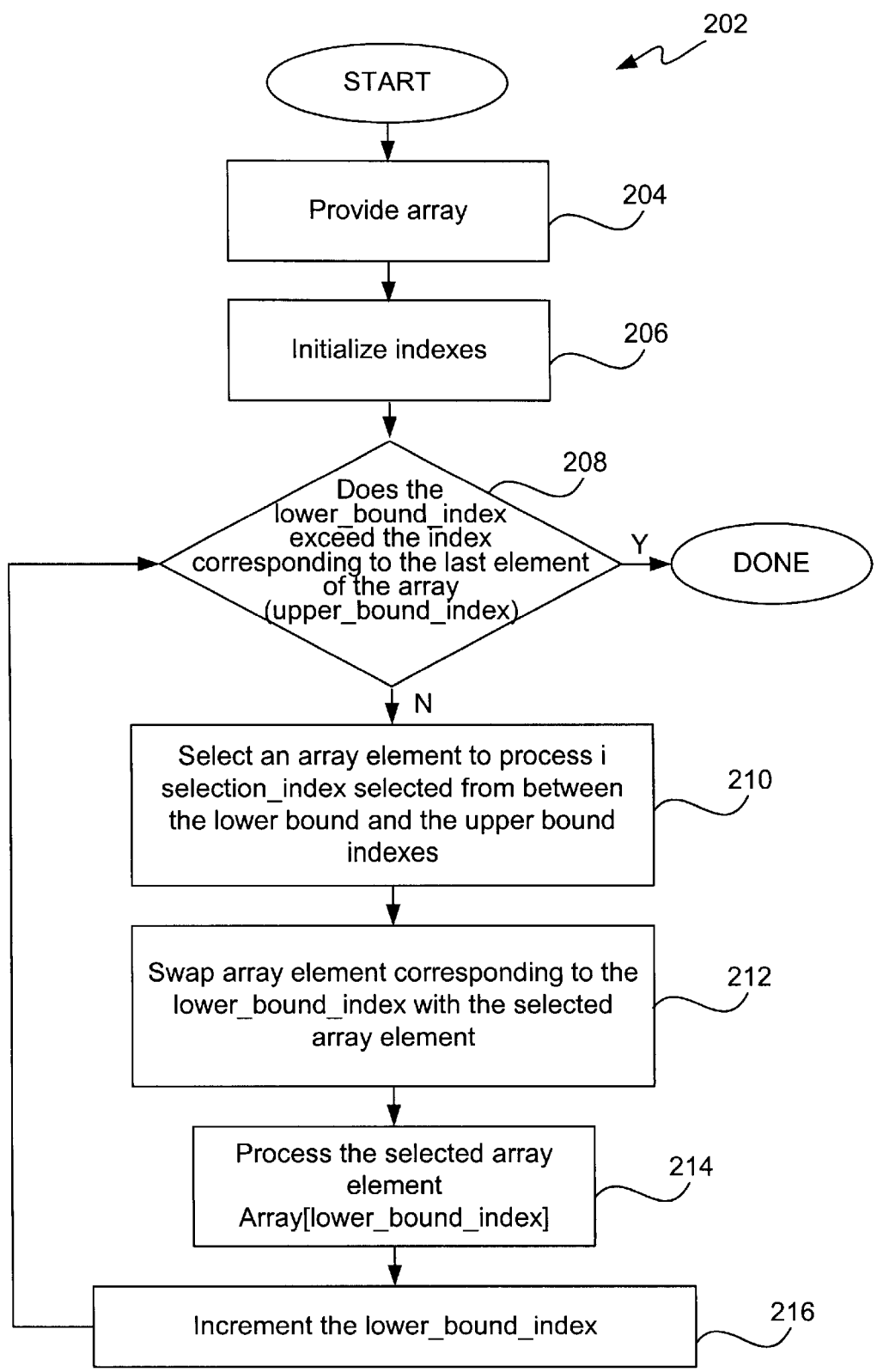
FIG. 2 illustrates a method for selecting and exhausting an entire array according to one embodiment of the present invention.

Referring now to FIG. 2, a method for selecting and exhausting an entire array 202 according to an embodiment of the present invention is illustrated. The array is obtained at step 204. The array includes a plurality of storage locations, each of which is capable of storing an array element. By way of example, the storage locations may include logical memory locations that are addressable through one or more indexes. The array may be provided according to any conventional manner. By way of example, an array having a plurality of elements (e.g., N elements) may be declared and filled with data. Thus, the array contains N unprocessed array elements. As yet another example, the array may be obtained from a separate software function or process.

Prior to processing the array, all variables, or indexes, to be used during the processing of the array are initialized at step 206. Each index may be implemented using a counter, a pointer, or other standard mechanism for accessing an array element. By way of example, for an array having N elements, an initial lower bound index corresponding to a first element in the array may be initialized to zero. Similarly, an upper bound index corresponding to a last element in the array may be initialized to (N−1). Accordingly, during the processing of the array, the lower bound index may be updated to reflect the selection of each array element.

Next, it is determined whether all elements in the array have been selected and processed. This is accomplished through determining whether the lower bound index exceeds the index corresponding to the last element of the array at step 208. As described above, the upper bound index corresponds to the last element in the array. Accordingly, if the lower bound index exceeds the upper bound index, all elements in the array have been selected and processed.

Each array element is selected to be processed according to a specified order. At step 210, an array element is selected to be processed according to a selection index. The selection index is selected from between the lower bound index and the upper bound index, inclusive, and may be obtained through any index generating process. By way of example, the index generating process may generate a random number or a number according to a priority order. The random number may be generated by any random number generator, while the priority order may be generated by a software process, table, or other suitable method. After the selection index is generated, the selected array element is the array element corresponding to the selection index. In other words, the selection index points to the selected array element.

Upon selection, the selected array element is swapped with an unselected array element. At step 212, the selected array element corresponding to the selection index is swapped with the array element corresponding to the lower bound index. By way of example, the first selected array element may be swapped with an array element located in a first storage location. In addition, each remaining array element which has not been previously selected may be selected and swapped with an array element located in a next storage location that is located adjacent the storage location of the previously selected array element. In this manner, each selected array element may be effectively removed from the array. In one embodiment, a temporary variable capable of storing one array element is utilized to swap these array elements. By way of example, the temporary variable may be used to contain the array element pointed to by the lower bound index. Thus, after the two array elements are swapped, the lower bound index points to the selected array element. The selected array element may then be processed at step 214.

In order to swap the selected array element with the unselected array element, a variable capable of storing a single array element may be utilized. Thus, since a second array or equivalent memory is not required, the present invention requires minimal data storage. In this manner, two array elements may be swapped efficiently while minimizing the required memory space.

During the reordering and processing of the array elements, the lower bound index may be updated at step 216 to reflect the selection of the array element. By way of example, the lower bound index may be incremented. As a result, the array includes a first section in which each array element that has been processed is stored and a second section containing each of the unprocessed array elements. By way of example, the first section may be bounded by the initial lower bound index and the current lower bound index, while the second section may be bounded by the current lower bound index and the upper bound index. As a result, the current lower bound index divides the array into two sections, providing an upper bound for the first section and a lower bound for the second section. Thus, since the unprocessed array elements are stored in contiguous memory locations, the processing of the array is simplified. The process then continues until it is determined that all elements in the array have been exhausted at step 208.

Referring to FIG. 3A, an exemplary array 302 on which the present invention may be applied is presented. As shown, the initial lower bound index 304 is zero. Since the array has N=7 elements, the upper bound index 306 is 6. If the selection index is equal to 5, the first selected array element 308 would be "F", as shown.

FIG. 3B illustrates the exemplary array 302 of FIG. 3A after a first application of the method of FIG. 2. The first selected array element 308, ARRAY[5], is swapped with an array element in a first storage location. As shown, the first selected array element 308, ARRAY[5], is swapped with the array element corresponding to the lower bound index 304, 0. Thus, ARRAY[0] is swapped with ARRAY[5], as shown. Thus, after the two array elements are swapped, the previous lower bound index 304, equal to zero, points to the previously selected array element 308. The lower bound index 304 is then incremented to 1. As a result, the array is effectively split into two sections. The first section, containing each selected array element, is bounded by the initial lower bound index 304 having a value of zero and the current lower bound index 304 having a value of 1. In addition, the second section, containing the array elements that remain to be selected, is bounded by the current lower bound index 304 having a value of 1 and the upper bound index 306 having a value of 6.

FIG. 3C illustrates the exemplary array 302 of FIG. 3A after a subsequent application of the method of FIG. 2. Each remaining array element which has not been previously selected is swapped with an array element located in a next storage location that is located adjacent the storage location of the previously selected array element. By way of example, if the selection index is equal to 3, the next selected array element 308 would be "D". The selected array element 308, ARRAY[3], is swapped with an array element located in a storage location that is located adjacent to the storage location of the previously selected element. As shown, the selected array element 308, ARRAY[3], is swapped with the array element corresponding to the lower bound index 304, 1. Thus, ARRAY[1] is swapped with ARRAY[3], as shown. Thus, after the two array elements are swapped, the previous lower bound index 304, equal to one, points to the previously selected array element 308. The lower bound index 304 is then incremented to 2. As a result, the first section of the array, containing each selected array element, is bounded by the initial lower bound index 304 having a value of zero and the current lower bound index 304 having a value of 2. In addition, the second section of the array, containing the array elements that remain to be selected, is bounded by the current lower bound index 304 having a value of 2 and the upper bound index 306 having a value of 6.

Upon completion of the method, each selected array element is stored in the array in ascending index order identical to the order in which the elements were selected. In this manner, the array may be reordered according to a priority scheme. Thus, the reordered array elements may subsequently be processed in ascending order according to this priority scheme. The ability to process the selected elements in ascending order facilitates further processing of the array elements. Moreover, this is achieved without requiring an additional array data structure or memory capable of storing more than one array element.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as separating an array into two sections during selection and reordering of the selected array elements. Although the selected array elements are stored in the first section, it should be understood that the present invention is not limited to such an exemplary arrangement, but instead would equally apply if the selected array elements were stored in the second section while decrementing the lower bound index. Also, the selected elements are described as being processed upon selection. This is not a requirement of the present invention and therefore, the entire array may be reordered prior to processing of the array elements. Moreover, each selected array element is described as being processed after being selected and swapped with an unselected array element. However, the above steps are illustrative only and may be performed in an alternative order. By way of example, the selected array element may be processed prior to being swapped with an unselected array element. In addition, the array may include multiple dimensions accessible by multiple indexes. Accordingly, the present embodiments are to be considered as illustrative and not restrictive, and the invention is not to be limited to the details given herein, but may be modified within the scope and equivalents of the appended claims.

What is claimed is:

1. A method for processing an array having a plurality of storage locations, each one of the plurality of storage locations being capable of storing an array element, the method comprising:
   (a) selecting a first array element in the array;
   (b) swapping the selected first array element with an array element located in a first storage location;
   (c) processing the first selected element;
   (d) selecting another array element in the array which has not been previously selected;
   (e) swapping the selected another array element with an array element located in a next storage location that is located adjacent the storage location of the previously selected array element;
   (f) processing the selected another array element; and
   (g) repeating steps (d)–(f) for additional array elements in the array, wherein each swapping step is performed only after each corresponding processing step.

2. A method for processing an array having a plurality of elements, comprising:
   selecting one of the plurality of elements;
   maintaining an index dividing the array into a first section containing each selected one of the plurality of elements and a second section containing each one of the plurality of elements that remain to be selected;
   swapping the selected one of the plurality of elements with one of the plurality of elements that remain to be selected such that the selected one of the plurality of elements is stored in the first section of the array; and
   processing the selected one of the plurality of elements, wherein said swapping step is performed only after said processing step.

3. The method as recited in claim 2, wherein maintaining the index includes:
   updating the index to reflect that the selected one of the plurality of elements has been swapped.

4. The method as recited in claim 3, wherein updating the index includes:
   incrementing the index.

5. The method as recited in claim 3, wherein updating the index includes:
   decrementing the index.

6. The method as recited in claim 2, wherein the index provides an upper bound for the first section and a lower bound for the second section.

7. The method as recited in claim 2, wherein the index provides a lower bound for the fist section and an upper bound for the second section.

8. The method as recited in claim 2, wherein selecting one of the plurality of elements includes:

randomly selecting the one of the plurality of elements.

9. The method as recited in claim 2, wherein selecting one of the plurality of elements includes:

selecting the one of the plurality of elements according to a priority order.

10. The method as recited in claim 2, wherein swapping the selected one of the plurality of elements further includes:

storing the selected one of the plurality of elements or the one of the plurality of elements that remain to be selected in a temporary variable capable of storing one array element.

11. The method as recited in claim 2, wherein selecting one of the plurality of elements comprises selecting one of the plurality of elements in a non-consecutive order.

12. A computer-readable medium recording software, the software disposed on a computer to perform a method for processing an array having a plurality of elements, the method comprising:

selecting one of the plurality of elements;

maintaining an index dividing the array into a first section containing each selected one of the plurality of elements and a second section containing each unselected one of the plurality of elements;

swapping the selected one of the plurality of elements with an unselected element in the array such that the selected one of the plurality of elements is stored in the first section of the array; and processing the selected one of the plurality of elements, wherein said swapping step is performed only after said processing step.

13. A computer system for processing an array having a plurality of elements, the computer system comprising:

a processor; and a memory having stored therein the following:

a module for selecting one of the plurality of elements;

a module for maintaining an index dividing the array into a first section containing each selected one of the plurality of elements and a second section containing each unselected one of the plurality of elements;

a module for swapping the selected one of the plurality of elements with an unprocessed element in the array such that the selected one of the plurality of elements is stored in the first section of the array; and a module for processing the selected one of the plurality of elements, wherein said swapping step is performed only after said processing step.

* * * * *